United States Patent
Naito et al.

(10) Patent No.: US 6,310,171 B1
(45) Date of Patent: Oct. 30, 2001

(54) RESIN COMPOSITION WITH BIODEGRADABILITY AND FOAMABILITY

(75) Inventors: Hiroshi Naito, Yamaguchi; Masahiro Yama, Hofu; Takahiro Kubo, Hofu; Katsumi Onishi, Hofu; Tsunahiro Nakae, Hofu, all of (JP)

(73) Assignee: Kanebo Limited, Tokyo (JP)

( * ) Notice: Subject to any disclaimer, the term of this patent is extended or adjusted under 35 U.S.C. 154(b) by 0 days.

(21) Appl. No.: 09/530,480

(22) PCT Filed: Oct. 26, 1998

(86) PCT No.: PCT/JP98/04851

§ 371 Date: Apr. 28, 2000

§ 102(e) Date: Apr. 28, 2000

(87) PCT Pub. No.: WO99/21915

PCT Pub. Date: May 6, 1999

(30) Foreign Application Priority Data

Oct. 29, 1997 (JP) .................................................. 9-314479

(51) Int. Cl.[7] .................................................. C08G 18/08
(52) U.S. Cl. .................................. 528/49; 528/80; 528/84; 528/361
(58) Field of Search ................................ 528/361, 49, 80, 528/84

(56) References Cited

U.S. PATENT DOCUMENTS

| 5,238,968 | 8/1993 | Morita et al. . |
| 5,314,927 | 5/1994 | Kondo et al. . |
| 5,378,792 | 1/1995 | Sterzel . |
| 5,422,053 | 6/1995 | Sterzel . |
| 5,447,962 | 9/1995 | Ajioka et al. . |
| 5,530,058 | 6/1996 | Imaizumi et al. . |
| 5,849,339 | 12/1998 | Nakanishi . |
| 5,922,832 | * 7/1999 | Randall et al. ....................... 528/361 |
| 6,111,033 | * 8/2000 | Loughman et al. ................. 528/361 |
| 6,136,905 | * 10/2000 | Suzuki et al. ....................... 528/361 |

FOREIGN PATENT DOCUMENTS

| 5-170965 | 7/1993 | (JP) . |
| 6-248106 | 9/1994 | (JP) . |

\* cited by examiner

*Primary Examiner*—John M. Cooney, Jr.
(74) *Attorney, Agent, or Firm*—Morgan & Finnegan, LLP

(57) ABSTRACT

The present invention relates to a resin composition for foam, which is used as a packing cushioning material, and an object thereof is to provide said composition which has biodegradability and is made from a principal raw material, lactic acid capable of contributing to the protection of global environment. The object can be attained by a resin composition having biodegradability and expandability, comprising a high-molecular weight polylactic acid having a melt viscosity of 0.01 to 50 in terms of a melt index value (MI), characterized in that said resin composition is prepared by compounding 0.1 to 5% by weight of at least one compound, which is selected from a polyisocyanate having an isocyanate group of not less than 2.0 equivalents/mol, an epoxy compound having an epoxy group of more than 2.0 equivalents/mol and an acid anhydride having an anhydrous carboxyl group of more than 2.0 equivalents/mol, with a prepolymer made of lactic acid wherein a molar ratio of a L-isomer to a D-isomer is within arange from 95:5 to 60:40 or from 40:60 to 5:95, and reacting the resulting mixture.

4 Claims, No Drawings

RESIN COMPOSITION WITH BIODEGRADABILITY AND FOAMABILITY

TECHNICAL FIELD

The present invention relates to a resin composition for foam, which has biodegradability and is made from a principal raw material, lactic acid capable of contributing to the protection of global environment, said resin composition being used as a packing cushioning material.

BACKGROUND ART

A large amount of plastic foams have been used as packing and packaging materials based on lightweight properties, cushioning property and formability thereof, and are made of raw materials, for example, chemical products from petroleum, such as polystyrene (PS), polyolefin and the like. However, it is difficult to effect disposal of the plastic foams after use to cause the following serious social problems. That is, a burning furnace is damaged by high combustion calorie generated on incineration and, furthermore, the plastic foams are not degraded when buried under the ground and also occupy the space of the place for disposal due to large volume.

A harmful influence of the untreated waste foams to be exerted on the natural ecosystem, for example, contamination of rivers, seas, etc. has becoming more serious. Therefore, there has been developed a biodegradable resin, which is degraded in the ecosystem and exerts little influence on the global environment. For example, a polyhydroxybutyrate resin synthesized in the microorganism, or a polyester of an aliphatic glycol and an aliphatic carboxylic acid, or a polyester resin containing caprolactone as a principal component has been suggested. However, the former is inferior in purity because it is synthesized by microorganism, and is also drastically inferior in productivity and use thereof is limited.

The latter is surely superior in productivity because it is prepared from those, which are easily available in large amount at cheap price, such as petroleum natural gas. However, it is not suited for practical use as a biodegradable foamed resin because it is a crystalline resin and has a low grass transition temperature. Furthermore, since it is prepared from the petroleum natural gas and a carbon dioxide gas is newly added to a carbon dioxide gas system that is present on the surface of the globe when it is degraded. Therefore, it does not contribute to the inhibition of an increase in carbon dioxide gas. From a long-term point of view, the availability is lowered in future because its raw material source is limited, thereby making it impossible to substantially contribute to the protection of the global environment.

Furthermore, a polymer of glycolic or lactic acid as a biodegradable raw material has been obtained by ring-opening polymerization of glycolide or lactide and employed as medical fibers. However, since the crystallizability as a constituent feature for fiber-forming capability is imparted to a resin, the resin polymer has never been used widely as a packaging container or a cushioning material if it is not formed into a foam.

An object of the present invention is to provide an expandable resin composition which has not only biodegradability but also excellent productivity, i.e. an expandable resin composition which is degradable due to microorganism and causes less burden to the global environment on disposal after use, and which has high productivity and is suited for practical use.

To attain the object, the present inventors have studied intensively about essential conditions for a biodegradable resin having high expandability with respect to base polymers, additives for increasing the molecular weight, and additives used for foaming. As a result, they have found a biodegradable resin composition having enough productivity to be suited for practical use, thus completing the present invention.

DISCLOSURE OF THE INVENTION

That is, the present invention provides a resin composition having biodegradability and expandability, comprising a high-molecular weight polylactic acid having a melt viscosity of 0.01 to 50 in terms of a melt index value (MI), characterized in that said resin composition is prepared by compounding 0.1 to 5% by weight of at least one compound, which is selected from a polyisocyanate having an isocyanate group of not less than 2.0 equivalents/mol, an epoxy compound having an epoxy group of more than 2.0 equivalents/mol and an acid anhydride having an anhydrous carboxyl group of more than 2.0 equivalents/mol, with a prepolymer of lactic acid wherein a molar ratio of a L-isomer to a D-isomer is within a range from 95:5 to 60:40 or from 40:60 to 5:95, and reacting the resulting mixture.

BEST MODE FOR CARRYING OUT THE INVENTION

In view of the biodegradability as a first constituent feature, possible inhibition of an increase in carbon dioxide gas in the natural world, and enough productivity and cost to be suited for practical use, a polylactic acid resin prepared from lactic acid, as a raw material derived from starch of cereals such as corn, is preferred. However, since the crystallizability is required to those which are usually used as fibers, those composed exclusively of an L-isomer of optical isomers are used. To the contrary, the crystallizability must be reduced as possible to form a foam. The reason is that crystallization of a crystalline resin proceeds in the process of impregnating with a blowing agent, thereby to inhibit the expandability.

Accordingly, the polymer in the present invention is a substantially amorphous polylactic acid resin obtained by ring-opening polymerization of lactide, which is prepared by using lactic acid wherein a molar ratio of an L-isomer to a D-isomer is within a range from 95:5 to 60:40 or from 40:60 to 5:95. Those wherein the molar ratio of the L-isomer to the D-isomer exceeds 95:5 or less than 5:95 can not be used because of high crystallizability, low expansion ratio and un-uniform foaming. The molar ratio is preferably within a range from 90:10 to 60:40 or from 40:60 to 10:90.

On the other hand, the glass transition temperature (Tg) gradually decreases in accordance with the ratio of the L-isomer to the D-isomer, and reaches a minimum value when the ratio is 50:50. When the glass transition point decreases, the expandability and the heat resistance of the foam are lowered, which is not preferred. That is, the glass transition temperature is preferably not less than 50° C. To adjust the glass transition temperature within the above range, it is necessary to adjust the proportion of the D-isomer within a range of not more than 40 mol % or not less than 60 mol %, and preferably not more than 30 mol % or not less than 70 mol %.

With respect to increase of the molecular weight as the second constituent feature, the melt viscosity of a general ester biodegradable resin is from about 30 to 100 in terms of a melt index value (MI), and is from about 100,000 to 250,000 in terms of a molecular weight. Even in case of an amorphous resin, the melt viscosity is not enough to form a foam with a high degree of foaming, which has a high expansion ratio of not less than ten times.

As a means for increasing the molecular weight, a polymer resin can be produced directly from lactide by using a multifunctional alcohol having three or more functional groups. However, it becomes difficult to remove the resulting resin from the reaction vessel and the productivity is lowered. Accordingly, it is preferred that a resin is once removed at the stage where the molecular weight is slightly low and then the molecular weight is increased by the following procedure.

To increase the molecular weight, a method of mixing with a crosslinking agent (coupling agent) capable of reacting with a terminal carboxyl group, a hydroxy group and an ester bond in a molecular chain in a molten state and reacting the resulting mixture is generally used, and a compound having an isocyanate group, an epoxy group or an anhydrous carboxyl group is useful.

Among these compounds (compounds having an isocyanate group, an epoxy group or an anhydrous carboxyl group), a compound having a functional group, other than the isocyanate group, of more than 2.0 eq./mol is required to react more effectively. The compound having the isocyanate group of 2.0 eq./mol can also be used preferably because it gradually reacts with water in a solid state after melt-kneading and crosslinking proceeds due to an allophanate bond or a urea bond.

Among the above three kinds of crosslinking agents, the isocyanate compound having a functional group of not less than 2.0 eq./mol is preferred and the isocyanate compound having a functional group of not less than 2.3 eq./mol is most preferred. The amount of the crosslinking agent to be used is at least 0.1% by weight. When the amount is smaller than 0.1% by weight, the molecular weight does not increase to an enough value to effect foaming. On the other hand, the upper limit is 5% by weight. When the amount exceeds 5% by weight, the unreacted crosslinking agent is remained or crosslinking proceeds excessively to form a large amount of a gel, resulting in poor expandability. The amount is preferably within a range from 0.3 to 3% by weight, and most preferably from 0.5 to 2% by weight in view of the quality and practical use.

It is not required that increase of the molecular weight using the prepolymer and crosslinking agent (coupling agent) is effected by using a novel apparatus and a novel method, and a known apparatus and a known method can be used. There can be used known apparatuses and methods, for example, a method of blending a pelletized prepolymer with a crosslinking agent, and melt-kneading the blend using a single-screw or twin-screw extruder, and a method of melting a prepolymer using a single-screw or twin-screw extruder, adding a crosslinking agent in a molten state, and kneading them.

It is necessary that the melt viscosity of the resin whose molecular weight was increased by the above method is within a range from 0.01 to 50 in terms of a melt index value (MI). This reason is that the expandability remarkably depends on the viscosity on foaming. As used herein, the MI value can be measured by the procedure in accordance with JIS and is a value determined at 190° C. under a load of 21.6 kg using an orifice having a diameter of 2 mm.

The MI value slightly varies depending on the required expansion ratio. When the expansion ratio is comparatively low, the MI value may be slightly high and a range from 5 to 50 can be applied. On the other hand, when the expansion ratio is high, a range from 0.01 to 5 can be applied, similarly.

To form a uniform and fine cell foam, a blowing nuclear agent is preferably compounded. As the blowing nuclear agent, there can be preferably used solid particles, for example, inorganic particles such as talc, silica, kaolin, zeolite, mica, alumina, etc.; and salts such as carbonate or bicarbonate, alkali metal salt of carboxylic acid, etc. Among them, talc is used in the resin composition of the present invention, particularly preferably.

The nuclear agent having a particle diameter of about 0.5 to 30 $\mu$m is usually preferred because the state of it dispersed in the resin is good and stable cells can be obtained. The amount thereof to be added is preferably not less than 0.1% by weight based on the resin composition, and is preferably 30% by weight at most. The amount is from 0.5 to 5% by weight, more preferably. When the amount is smaller than 0.1% by weight, the size of cells scatters and an un-uniform foam is likely to be formed. On the other hand, when the amount exceeds 30% by weight, the foaming effect is limited and, furthermore, mechanical properties are deteriorated and an advantage such as lightweight is impaired by an increase in weight due to increase in specific gravity.

Other additives can be added appropriately according to purposes, and examples thereof include heat stabilizers, antioxidants, flame retardants, ultraviolet absorbers, plasticizers and the like. Since a halide such as chlorine is often used as the flame retardant, it is preferably used in a minimum amount as possible in view of the biodegradability and evolution of a harmful substance on incineration.

The resin composition thus obtained is formed into pellets or beads-like particles, which are then impregnated with a blowing agent and an auxiliary blowing agent. These particles are usually subjected to primary foaming (prefoaming) by heating to form foamed particles at an expansion ratio within a range from several to 20–50 times, which are then subjected to secondary foaming by heating furthermore to form a desired foam.

The pellets and beads to be impregnated with the blowing agent or auxiliary blowing agent can be appropriately selected according to the size and shape of the form. In case of a polystyrene foam, those having a diameter of 0.5 to 2 mm are usually used. In case of a precise foam, particles having a diameter of 0.5 to 1 mm are generally used.

The blowing agent and auxiliary blowing agent used herein include the followings. For example, hydrocarbons such as propane, n-butane, isobutane, n-pentane, isopentane, neopentane, cyclopentane, hexane, butane, etc.; halogenated hydrocarbons such as methyl chloride, methylene chloride, dichlorodifluoromethane, etc.; and ethers such as dimethyl ether, methyl ethyl ether, etc. are used as the blowing agent. In addition, alcohol having 1 to 4 carbon atoms, ketones, ether, benzene, and toluene are used as the auxiliary blowing agent.

A combination of the blowing agent and auxiliary blowing agent must be appropriately selected according to the resin to be used. In case of the polylactic acid polymer wherein the L-isomer and D-isomer are copolymerized used in the present invention, butane or pentane is preferably used as the blowing agent. A C1 to C4 monohydric alcohol is preferred as the auxiliary blowing agent used in combination with the blowing agent. The combination can be selected from various other combinations in light of purposes and economical efficiency.

The mixing ratio of the blowing agent to the auxiliary blowing agent is within a range from 1:2 to 10:1, but this ratio varies depending on the combination of the blowing agent and auxiliary blowing agent and is generally within a range from 1:2 to 2:1. The impregnation amount (degree) of the blowing agent and auxiliary blowing agent varies depending on the desired expansion ratio, storage period of pellets or beads or the like, but the amount of the blowing agent is usually within a range from about 5 to 15% by weight. The impregnation amount (degree) of the blowing agent can be selected according to the expansion ratio. Generally, the impregnation amount (degree) may be low in case of a foam with a low degree of foaming, whereas, the impregnation amount (degree) may be high in case of a foam with a high degree of foaming.

The pellets or beads-like particles impregnated with the blowing agent and auxiliary blowing agent are prefoamed and put in a mold, where the prefoamed pellets or beads-like particles are further foamed by heating, thereby to melt-bond cells each other, thus forming into a rigid foam. This molding method is basically the same as that of a polystyrene (PS) foam. That is, steam having a high heat capacity is preferably used in both of prefoaming and expansion foaming. Foaming can be effected by using hot air, but the foaming efficiency is not good because of small heat capacity. Accordingly, it is not suited for the foam with a high degree of foaming.

EXAMPLES

The following Examples and Comparative Examples further illustrate the present invention in detail. The evaluation was effected by the following procedure.

(Evaluation Procedures)

(1) Solution viscosity ($\eta r$): It is a value measured in a solution of tetrachloroethane and phenol in a weight ratio of 2:3 at 20° C.

(2) MI: It is measured by the procedure in accordance with JIS K7210 (under the following conditions: measuring temperature: 190° C., orifice diameter: 2 mm, load: 21.6 kg).

(3) Expansion ratio: Using a measuring cylinder, a volume of pellets impregnated with a blowing agent before foaming and a volume of prefoamed particles were measured and an expansion ratio was determined in the following manner.

Expansion ratio (times)=volume of prefoamed particles/ volume of pellets impregnated with a blowing agent (4) Biodegradability: The prefoamed particles were allowed to stand in a compost for one month and the biodegradability was evaluated by the appearance in the following manner.

⊚: degraded in a state where an original form is lost

○: degraded drastically although an original form is retained

Δ: little change

×: no change (5) Heat resistance: The above foam was cut into a test piece in size of 100×100×30 mm and, after treating in an oven at 60° C. for two hours, the heat resistance was evaluated by a dimensional change.

⊚: no change

○: change of 1% or less

Δ: change of 1 to 5%

×: change of 5% or more (6) Compression stress ratio: The above foam was cut into a test piece in size of 30×30×30 mm and, after measuring a compression strain at a load rate of 10 mm/min., the compression stress ratio was evaluated by a comparison with a stress of polystyrene (PS) at 50% compression.

Preparation Example

Commercially available L-lactide and D-lactide were respectively purified by recrystallizing from ethyl acetate. In accordance with the composition shown in Table 1, purified L-lactide, purified D-lactide and tin octylate were charged in an autoclave equipped with a stirrer, vacuum-deaerated and then subjected to ring-opening polymerization in a $N_2$ atmosphere under the respective polymerization conditions. After the completion of the reaction, a polymer was removed from the autoclave and the viscosity ($\eta r$) was measured. As a result, a polymer having $\eta r$ of 3.3 to 3.5 was obtained.

TABLE 1

| | Polymer Nos. | | | | | | | | | | |
|---|---|---|---|---|---|---|---|---|---|---|---|
| | P1 | P2 | P3 | P4 | P5 | P6 | P7 | P8 | P9 | P10 | P11 |
| L-lactide (mol %) | 100 | 95 | 90 | 70 | 60 | 50 | 40 | 30 | 10 | 5 | — |
| D-lactide (mol %) | — | 5 | 10 | 30 | 40 | 50 | 60 | 70 | 90 | 95 | 100 |
| Polymerization temperature (° C.) | 190 | 180 | 170 | 170 | 170 | 170 | 170 | 170 | 170 | 180 | 190 |
| Polymerization time (Hr) | 2 | 2 | 2 | 2 | 2 | 2 | 2 | 2 | 2 | 2 | 2 |
| ηr | 3.5 | 3.4 | 3.45 | 3.3 | 3.32 | 3.3 | 3.3 | 3.25 | 3.2 | 3.2 | 3.2 |
| Tm (° C.) | 174 | 151 | — | — | — | — | — | — | — | 155 | 172 |
| ΔH (J/g) | 10.8 | 0.1 | — | — | — | — | — | — | — | 0.2 | 10.1 |
| Tg (° C.) | 60 | 57 | 56 | 53 | 51 | 46 | 50 | 53 | 55 | 57 | 59 |

(Note) The amount of the catalyst is 0.04% by weight based on the total amount of lactide in case of any polymer.

Examples 1 to 8, Comparative Examples 1 to 3

In accordance with the composition shown in Table 2, each of polylactic acids P1 to P11 was kneaded with an isocyanate compound "MILLIONATE MR-200" (isocyanate group: 2.7 to 2.8 eq. /mol, manufactured by NIPPON POLYURETHANE Co., Ltd.) and 1.0% by weight of talc "LMP100" (manufactured by FUJI TALC Industries Co., Ltd.) at a cylinder temperature of 180° C. using a twin-screw extruder (PCM-30, manufactured by IKEGAI Corp.) to obtain resin pellets, respectively.

Then, ηr and MI of these resins were measured. 2000 parts of each kneaded product, 380 parts of pentane as a blowing agent and 480 parts of methanol as an auxiliary blowing agent were charged in an autoclave and, after sealing, the autoclave was heated at a rate of 20° C./Hr and then maintained at 70° C. for one hour. After cooling to 25° C., the resin was removed and air-dried and then the impregnation degree was determined. The resulting pellets impregnated with the blowing agent were prefoamed by using steam (92° C., one minute), and then the bulk density and biodegradability were evaluated.

After aging for one day, a closed mold was packed with the resulting prefoamed particles and molding was effected by heating for 30 seconds under a steam pressure of 0.5 kg/cm$^2$ using a steam molding machine to obtain a foam in size of 300×300×30 mm. A test piece was cut from this foam and then the heat resistance and compression stress were evaluated. As a control for each evaluation, a commercially available polystyrene foam "REWPEARL 55KS Y-3171" (manufactured by DAINIPPON INK CHEMICAL INDUSTRIES Co., Ltd.) was used. The evaluation results are as shown in Table 2.

TABLE 2

| Test Nos. | Polylactic acid | Molar ratio of L-isomer to D-isomer | Crosslinking agent (% by weight) | Number of functional groups (eq./mol) | ηr |
|---|---|---|---|---|---|
| Comp. Example 1 | P1 | 100/0 | MILLIONATE MR-200 1.0 | 2.7–2.8 | 5.2 |
| Example 1 | P2 | 95/5 | MILLIONATE MR-200 1.0 | 2.7–2.8 | 5.3 |
| Example 2 | P3 | 90/10 | MILLIONATE MR-200 1.0 | 2.7–2.8 | 5.0 |
| Example 3 | P4 | 70/30 | MILLIONATE MR-200 1.0 | 2.7–2.8 | 5.1 |
| Example 4 | P5 | 60/40 | MILLIONATE MR-200 1.0 | 2.7–2.8 | 5.0 |
| Comp. Example 2 | P6 | 50/50 | MILLIONATE MR-200 1.0 | 2.7–2.8 | 5.0 |
| Example 5 | P7 | 40/60 | MILLIONATE MR-200 1.0 | 2.7–2.8 | 5.0 |
| Example 6 | P8 | 30/70 | MILLIONATE MR-200 1.0 | 2.7–2.8 | 5.1 |
| Example 7 | P9 | 10/90 | MILLIONATE MR-200 1.0 | 2.7–2.8 | 5.1 |
| Example 8 | P10 | 5/95 | MILLIONATE MR-200 1.0 | 2.7–2.8 | 5.2 |
| Comp. Example 3 | P11 | 0/100 | MILLIONATE MR-200 1.0 | 2.7–2.8 | 5.3 |
| PS foam | — | — | — | — | — |

| Test Nos. | MI (g/10 min.) | Expansion ratio (times) | Biodegradability | Heat resistance | Compression stress ratio at 50% strain |
|---|---|---|---|---|---|
| Comp. Example 1 | 0.6 | 2 | ⊙ | — | 99.0 |
| Example 1 | 0.6 | 16 | ⊙ | ⊙ | 98.5 |
| Example 2 | 0.5 | 23 | ⊙ | ⊙ | 93.1 |
| Example 3 | 0.5 | 25 | ⊙ | ⊙ | 90.0 |

TABLE 2-continued

| Example 4 | 0.5 | 25 | ○ | ○ | 84.6 |
| Comp. Example 2 | 0.4 | 28 | ○ | △ | 78.0 |
| Example 5 | 0.5 | 25 | ○ | ○ | 85.0 |
| Example 6 | 0.5 | 25 | ⊚ | ⊚ | 89.7 |
| Example 7 | 0.6 | 24 | ⊚ | ⊚ | 93.9 |
| Example 8 | 0.6 | 18 | ⊚ | ⊚ | 98.4 |
| Comp. Example 3 | 0.6 | 3 | ⊚ | — | 98.8 |
| PS foam | — | 23 | × | ⊚ | 100 |

(Evaluation Results)

The resin composition prepared by kneading a prepolymer of lactic acid, wherein a molar ratio of a L-isomer to a D-isomer is within a range from 95:5 to 60:40 or from 40:60 to 5:95, with 1% by weight of polyisocyanate having an isocyanate group of not less than 2.0 equivalents/mol, showed good expandability, biodegradability, heat resistance and mechanical properties. When the molar ratio of the L-isomer to the D-isomer, L/D, exceeds 95:5 or smaller than 5:95, the expandability was poor because of high crystallizability. On the other hand, when L/D is smaller than 60:40 or exceeds 40:60, Tg was low and both of the heat resistance and mechanical properties was poor.

Examples 9 to 18, Comparative Examples 4 to 7

In accordance with the composition shown in Table 3, polylactic acid P3 was kneaded with an isocyanate compound "MILLIONATE MR-200" (isocyanate group: 2.7 to 2.8 eq./mol, manufactured by NIPPON POLYURETHANE Co., Ltd.), "PAPI20J" (isocyanate group: 3.0 eq./mol, manufactured by MITSUBISHI CHEMICAL DOW Co., Ltd.) or "MILLIONATE MT" (isocyanate group: 2.0 eq./mol, manufactured by NIPPON POLYURETHANE Co., Ltd.), an epoxy compound "DENACOAL EX-313" (epoxy group: 2.0 eq./mol, manufactured by NAGASE CHEMICAL INDUSTRIES Co., Ltd.) or "DENACOAL EX-314" (epoxy group: 2.3 eq./mol, manufactured by NAGASE CHEMICAL INDUSTRIES Co., Ltd.), an acid anhydride "BTDA" (anhydrous carboxyl group: 2.0 eq./mol, manufactured by DAICEL CHEMICAL INDUSTRIES Co., Ltd.) and 1.0% by weight of talc "LMP100" (manufactured by FUJI TALC Co., Ltd.) at a cylinder temperature of 180° C. using a twin-screw extruder (PCM-30, manufactured by IKEGAI Corp.) to obtain resin pellets, respectively. Then, ηr and MI of these resins were measured. Impregnation with the blowing agent, foaming test and evaluation were effected in the same manner as in Examples 1 to 8 and Comparative Examples 1 to 3. The evaluation results are as shown in Table 3.

TABLE 3

| Test Nos. | Polylactic acid | Molar ratio of L-isomer to D-isomer | Crosslinking agent (% by weight) | Number of functional groups (eq./mol) | ηr |
|---|---|---|---|---|---|
| Comp. Example 4 | P3 | 90/10 | — | 2.7–2.8 | 3.3 |
| Example 9 | P3 | 90/10 | MILLIONATE MR-200 0.1 | 2.7–2.8 | 4 |
| Example 10 | P3 | 90/10 | 0.25 | 2.7–2.8 | 4.4 |
| Example 11 | P3 | 90/10 | 0.5 | 2.7–2.8 | 5 |
| Example 12 | P3 | 90/10 | 1 | 2.7–2.8 | 5 |
| Example 13 | P3 | 90/10 | 3 | 2.7–2.8 | 4.3 |
| Example 14 | P3 | 90/10 | 5 | 2.7–2.8 | 4.0 |
| Example 15 | P3 | 90/10 | 1 | 2.7–2.8 | 6 |
| Comp. Example 5 | P3 | 90/10 | 7 | 2.7–2.8 | impossible to measure |
| Example 16 | P3 | 90/10 | PAPI20J 0.5 | 3 | 5.2 |
| Example 17 | P3 | 90/10 | MILLIONATE MT 0.5 | 2 | 4.5 |
| Comp. Example 6 | P3 | 90/10 | DENACOAL EX-313 0.5 | 2 | 3.4 |
| Example 18 | P3 | 90/10 | DENACOAL EX-314 0.5 | 2.3 | 5 |
| Comp. Example 7 | P3 | 90/10 | BDTA 0.5 | 2 | 3.4 |
| PS foam | — | — | — | — | — |

| Test Nos. | MI (g/10 min.) | Expansion ratio (times) | Biodegradability | Heat resistance | Compression stress ratio at 50% strain |
|---|---|---|---|---|---|
| Comp. Example 4 | 126.3 | 3 | ⊚ | — | — |
| Example 9 | 48.8 | 13 | ⊚ | ⊚ | 92.0 |
| Example 10 | 22.1 | 15 | ⊚ | ⊚ | 92.5 |
| Example 11 | 5 | 18 | ⊚ | ⊚ | 92.8 |
| Example 12 | 0.6 | 19 | ⊚ | ⊚ | 93.1 |
| Example 13 | 0.06 | 19 | ○ | ⊚ | 93.5 |
| Example 14 | 0.02 | 16 | ○ | ⊚ | 94.0 |

TABLE 3-continued

| | | | | | |
|---|---|---|---|---|---|
| Example 15 | 0.1 | 19 | ⊚ | ⊚ | 93.3 |
| Comp. Example 5 | <0.01 | 4 | Δ | — | — |
| Example 16 | 4 | 20 | ⊚ | ⊚ | 93.2 |
| Example 17 | 8 | 15 | ⊚ | ⊚ | 92.2 |
| Comp. Example 6 | 116 | 3 | ⊚ | — | — |
| Example 18 | 5.2 | 16 | ⊚ | ⊚ | 93.3 |
| Comp. Example 7 | 112.6 | 3 | ⊚ | — | — |
| PS foam | — | 23 | × | ⊚ | 100 |

(Evaluation Results)

The resin composition prepared by compounding a pre-polymer of polylactic acid, wherein a molar ratio of a L-isomer to a D-isomer is 90:10, with 0.1 to 5% by weight of at least one compound selected from polyisocyanate having an isocyanate group of not less than 2.0 equivalents/mol, an epoxy compound having an epoxy group of more than 2.0 equivalents/mol and an acid anhydride having an anhydrous carboxyl group of more than 2.0 equivalents/mol, and reacting the resulting mixture had MI within a range from 0.01 to 50 g/10 min. and showed good expandability, biodegradability, heat resistance and mechanical properties.

In case where the crosslinking agent is an isocyanate having an isocyanate group of less than 2.0 equivalents/mol, an epoxy compound having an epoxy group of not more than 2.0 equivalents/mol or an acid anhydride having an anhydrous carboxyl group of not more than 2.0 equivalents/mol, the viscosity of the resulting resin composition is low and the expandability was poor. When the amount of the crosslinking agent to be added is less than 0.1% by weight, the viscosity of the resin composition did not increase and the expandability was poor. On the other hand, when the amount exceeds 5% by weight, gelation occurred and the expandability was poor, thus obtaining a foam which is not uniform and is inferior in utility.

Examples 19 to 26, Comparative Example 8

In accordance with the composition shown in Table 4, polylactic acid P4 was kneaded with 0.5% by weight of an isocyanate compound "MILLIONATE MR-200" (isocyanate group: 2.7 to 2.8 eq. /mol, manufactured by NIPPON POLYURETHANE Co., Ltd.) and talc "LMP100" (manufactured by FUJI TALC Co., Ltd.) or kaolin "ASP170" (manufactured by TSUCHIYA KAOLIN) at a cylinder temperature of 180° C. using a twin-screw extruder (PCM-30, manufactured by IKEGAI Corp.) to obtain resin pellets, respectively. Then, ηr and MI of these resins were measured. Impregnation with the blowing agent, foaming test and evaluation were effected in the same manner as in Example 1. The evaluation results are as shown in Table 4.

(Evaluation results)

The blowing nuclear agent such as talc, kaolin, etc. is not specifically required to effect foaming, but is preferably compounded to effect fine and uniform foaming. The amount thereof is within a range from 0.1 to 30% by weight, and preferably from 0.5 to 5% by weight. When the amount is smaller than 0.1% by weight, the expandability is likely to become poor. On the other hand, when the amount exceeds 30% by weight, the expandability and mechanical properties are likely to become poor.

TABLE 4

| Test Nos. | Polylactic acid | Molar ratio of L-isomer to D-isomer | Crosslinking agent (% by weight) | Blowing nuclear agent (% by weight) | ηr |
|---|---|---|---|---|---|
| Example 19 | P3 | 90/10 | MILLIONATE MR-200 0.5 | — | 5.0 |
| Example 20 | P3 | 90/10 | MILLIONATE MR-200 0.5 | Talc 0.1 | 5.0 |
| Example 21 | P3 | 90/10 | MILLIONATE MR-200 0.5 | 0.5 | 5.0 |
| Example 22 | P3 | 90/10 | MILLIONATE MR-200 0.5 | 3 | 5.0 |
| Example 23 | P3 | 90/10 | MILLIONATE MR-200 0.5 | 5 | 4.9 |
| Example 24 | P3 | 90/10 | MILLIONATE MR-200 0.5 | 10 | 4.7 |
| Example 25 | P3 | 90/10 | MILLIONATE MR-200 0.5 | 30 | 4.4 |
| Comp. Example 8 | P3 | 90/10 | MILLIONATE MR-200 0.5 | 50 | 3.8 |
| Example 26 | P3 | 90/10 | MILLIONATE MR-200 0.5 | Kaolin 0.5 | 5.0 |
| PS foam | — | — | — | — | — |

| Test Nos. | MI (g/10 min.) | Expansion ratio (times) | Biodegradability | Heat resistance | Compression stress ratio at 50% strain |
|---|---|---|---|---|---|
| Example 19 | 5 | 14 | ⊚ | ⊚ | 92.5 |
| Example 20 | 5.1 | 17 | ⊚ | ⊚ | 92.6 |
| Example 21 | 5 | 20 | ⊚ | ⊚ | 92.8 |

TABLE 4-continued

| | | | | | |
|---|---|---|---|---|---|
| Example 22 | 5.2 | 20 | ⊙ | ⊙ | 92.7 |
| Example 23 | 5.3 | 18 | ⊙ | ⊙ | 93.0 |
| Example 24 | 7.5 | 17 | ⊙ | ⊙ | 93.5 |
| Example 25 | 9.1 | 14 | ⊙ | ⊙ | 93.9 |
| Comp. Example 8 | 85.5 | 4 | ⊙ | ⊙ | — |
| Example 26 | 5.1 | 18 | ⊙ | ⊙ | 92.6 |
| PS foam | — | 23 | × | ⊙ | 100 |

INDUSTRIAL APPLICABILITY

As described above, the resin composition of the present invention is a resin, which has the expandability, heat resistance and mechanical properties that are the same as or higher than those of a polystyrene (PS) foam used conventionally, and which has excellent biodegradability and contributes to the protection of global environment.

What is claimed is:

1. A resin composition having biodegradability and expandability, comprising a polylactic acid having a melt viscosity of 0.01 to 5 in terms of a melt index value (MI), characterized in that said resin composition is prepared by compounding 0.1 to 5% by weight of a polyisocyanate compound having an isocyanate group of not less than 2.0 equivalents/mol with a prepolymer of polylactic acid wherein the prepolymer has a molar ratio of L-isomer to D-isomer within a range selected from the group consisting of from 95:5 to 60:40 and from 40:60 to 5:95, and reacting the resulting mixture.

2. The resin composition according to claim 1, wherein the molar ratio of the L-isomer to the D-isomer is within a range selected from the group consisting of from 90:10 to 70:30 and from 30:70 to 10:90.

3. The resin composition according to claim 1 or 2, wherein the compound to be compounded with the prepolymer is a polyisocyanate having an isocyanate group of not less than 2.3 equivalents/mol.

4. The resin composition according to claim 1, which contains, as an additive, at least one blowing nuclear agent selected from inorganic particles, carbonate and bicarbonate, and an alkali metal salt of a carboxylic acid.

* * * * *